United States Patent Office 3,122,503
Patented Feb. 25, 1964

3,122,503
DISPERSING CLAYEY DEPOSITS
Melvin F. Katzer, Danville, Calif., assignor to The Dow Chemical Company, Midland, Mich., a corporation of Delaware
No Drawing. Filed Mar. 20, 1961, Ser. No. 96,642
7 Claims. (Cl. 252—8.55)

The present invention relates to a novel process for treating clayey deposits within various dissimilar support media. More particularly, the invention concerns rendering such clayey deposits more susceptible to dispersion or removal by washing with water.

The invention, being directed to a method for promoting the easy and efficacious dispersion or removal of clayey deposits, is applicable to several widely divergent arts. One application involves the reactivation of silted sand filter beds which are often encountered in water purification plants. Another application, which is related to the oil well treating art, concerns the removal of production hindering clayey deposits from oil-bearing sand or vuggy rock formations in oil wells. A somewhat related but distinct application involves the dispersing of drilling mud sheaths formed inside oil well bores during the drilling of the well. A still further and entirely unrelated application involves removing undesirable clayey deposits from rock interstices prior to putting in rock-based foundations for bridges, dams, buildings and the constructions.

While methods for dispersing or removing the aforementioned clayey deposits are known, it is highly desirable to provide novel and improved methods for accomplishing such results. A particular object of the invention is to promote the easy removal of clayey silt from sand in water filtration beds. Another object is to promote the removal or dispersion of clayey deposits in oil-bearing formations. A still further object concerns promoting the removal of clayey deposits from rock formations prior to placing structural foundations thereon. Other objects and benefits of the present invention will become manifest as the invention is hereinafter more fully described.

In accordance with the present invention, it has been discovered that the removal of clayey deposits from dissimilar support media of geognostic origin is promoted by contacting the clayey deposits with a hypochlorite, i.e., a compound containing the monovalent ClO$^-$ radical. Clayey deposits thus treated are readily dispersed by the washing action of water. The water may be sprayed, pumped or otherwise brought forcibly against the treated deposits or simply poured over or into treated deposits in any convenient manner.

Specific hypochlorites are sodium hypochlorite, potassium hypochlorite, lithium hypochlorite, calcium hypochlorite, calcium oxychloride (bleaching powder), magnesium hypochlorite, barium hypochlorite and the like.

The hypochlorite employed is conveniently applied in the form of a dilute aqueous solution. The concentration of the hypochlorite in such a solution is not critical. Commercial hypochlorite solutions usually contain from about 4 to 6 percent of the active ingredient. However, depending upon the particular application, it may be desirable to employ hypochlorite solutions having greater or lesser concentrations of the active ingredient. The activity of the hypochlorite is proportional to the total amount employed which, in turn, is determined in a particular application by the total amount of clayey deposits to be treated. The clayey deposit is treated with enough of the hypochlorite to render it readily dispersible by moving water.

Means for applying the hypochlorite to the clayey deposit vary according to the requirements of a particular application. In the form of a solution, it may be applied by pouring, spraying, injecting and the like operations depending upon which is most convenient under the circumstances. It should also be understood that while it is generally most expedient to employ the hypochlorite in the form of a solution, it is also possible, in some applications, to employ the hypochlorite as a dry powder. For example, it may be advantageous in treating large surface areas such as silted bottoms of settling reservoirs, the purpose of which reservoirs is to promote the recharging of the subterranean water supply, to first spread the hypochlorite on the bottom surface as a dry powder and subsequently to wet the surface with water in order to contact the hypochlorite effectively with the silt deposit. Silt deposits thus treated are readily dispersed with additional water.

The following examples are given to better illustrate the advantages and benefits that may be obtained in the practice of the present invention.

A vertical glass tube 1 inch in diameter was packed with 12 inches of sand. In the testing operations, water was introduced into the tube above the sand at a rate sufficient to maintain a 9 inch head of water. The percolation rate of water through the sand bed was determined by measuring the amount of water filtering through the bed for specified periods of time.

Initially, the normal percolation rate of the packed sand column was ascertained and then a clayey silt that had previously been precipitated from turbid water with a polyacrylamide flocculant was added to the tube above the sand. The results of the foregoing and of subsequent treatments, as specified in the following table, directed to improving the filterability of the sand by removing or dispersing the silt, are reported below as run 1. Run 2, also reported in the following table, was carried out in a manner identical to the foregoing procedure.

| Treatment | Percolation Rate (cc./min.) | Percent of Normal Capacity |
|---|---|---|
| Run 1: | | |
| Control | 150 | 100 |
| Silt added | plugged | |
| Silt stirred into sand | 63 | 42 |
| Liquid surfactant added; aged 10 minutes | 48 | 32 |
| After ageing 20 minutes | very slow | |
| 50 ml. of 5.25 percent aqueous solution of sodium hypochlorite aged 5 minutes | 147 | 98 |
| After aging several more minutes | 159 | 106 |
| Run 2: | | |
| Control | 143 | 100 |
| Silt added | plugged | |
| Silt stirred into sand | 30 | 21 |
| 50 ml. of 0.98 M HCl added | 45 | 32 |
| Additional 50 ml. of 0.98 M HCl added | 47 | 33 |
| After aging for 60 minutes | 49 | 34 |
| 50 ml. of a 5.25 percent aqueous solution of sodium hypochlorite added, aged for 15 minutes | 143 | 100 |
| After aging for an additional 45 minutes | 159 | 111 |
| Recharge with silt | plugged | |
| Silt stirred into sand | 34.5 | 24 |
| 50 ml. of a 5.25 percent aqueous solution of sodium hypochlorite added, aged for 12 minutes | 159 | 111 |

In the treatment of oil well boreholes in which a sheath of drilling mud remains intact on the face of an oil-bearing formation adjacent to the borehole, an aqueous solution containing 10 percent sodium hypochloride is introduced into the well bore and directed to that portion of the well bore coated with the mud sheath. The aqueous hypochlorite solution is forcibly directed against the clay for a period of time sufficient to disperse the clayey material leaving the surface of the formation exposed. The dispersed clay is then removed from the well by bailing, washing with clear water or the like.

In a manner similar to that of the foregoing, other clayey deposits such as those naturally occurring in rock and sand formations as well as flocculated deposits are contacted with a hypochlorite such as potassium hypochlorite, lithium hypochlorite, calcium hypochlorite, calcium oxychloride, magnesium hypochlorite and barium hypochlorite to promote the efficacious removal or dispersion thereof by washing with water.

What is claimed is:

1. A method for promoting the removal of clayey deposits in rock and sand formations by contacting the clayey deposit with an aqueous solution of a water-soluble hypochlorite.

2. A method as in claim 1 wherein the hypochlorite is sodium hypochlorite.

3. A method as in claim 1 wherein the hypochlorite is potassium hypochlorite.

4. A method as in claim 1 wherein the hypochlorite is lithium hypochlorite.

5. A method as in claim 1 wherein the hypochlorite is calcium hypochlorite.

6. A method as in claim 1 wherein the hypochlorite is calcium oxychloride.

7. A method for treating oil wells to promote the dispersion of clayey deposits therein which comprises introducing into the oil well bore an aqueous solution of a hypochlorite.

References Cited in the file of this patent
UNITED STATES PATENTS

| | | |
|---|---|---|
| 2,198,435 | Hart | Apr. 23, 1940 |
| 2,221,353 | Limerick et al. | Nov. 12, 1940 |
| 2,322,484 | Stuart | June 22, 1943 |

OTHER REFERENCES

Beeson: Well Completion Practices, article in World Oil, January 1950, pp. 88, 89 and 90.